(12) United States Patent
Green et al.

(10) Patent No.: US 8,574,323 B2
(45) Date of Patent: Nov. 5, 2013

(54) MARKER COMPOUNDS FOR LIQUID HYDROCARBONS AND OTHER FUELS AND OILS

(75) Inventors: George David Green, Cary, IL (US); Raymond John Swedo, Mt. Prospect, IL (US)

(73) Assignee: Angus Chemical Company, Buffalo Grove, IL (US)

( * ) Notice: Subject to any disclaimer, the term of this patent is extended or adjusted under 35 U.S.C. 154(b) by 260 days.

(21) Appl. No.: 13/113,147

(22) Filed: May 23, 2011

(65) Prior Publication Data

US 2011/0289831 A1 Dec. 1, 2011

Related U.S. Application Data

(60) Provisional application No. 61/348,777, filed on May 27, 2010.

(51) Int. Cl.
*C10L 1/16* (2006.01)
*C10L 1/185* (2006.01)

(52) U.S. Cl.
USPC ............... 44/451; 568/626; 568/659; 585/25; 585/14; 44/447

(58) Field of Classification Search
USPC .......................................................... 44/600
See application file for complete search history.

(56) References Cited

U.S. PATENT DOCUMENTS

| 5,981,283 | A | 11/1999 | Anderson et al. |
| 2004/0092738 | A1 | 5/2004 | Park et al. |
| 2007/0184555 | A1 | 8/2007 | Banavali et al. |
| 2009/0054587 | A1* | 2/2009 | Oshimi et al. ................ 524/612 |
| 2009/0137725 | A1* | 5/2009 | Murata et al. ................ 524/541 |

FOREIGN PATENT DOCUMENTS

EP 512404 11/1992

\* cited by examiner

*Primary Examiner* — Ellen McAvoy
*Assistant Examiner* — Ming Cheung Po
(74) *Attorney, Agent, or Firm* — Kenneth Crimaldi

(57) ABSTRACT

A compound having formula (I)

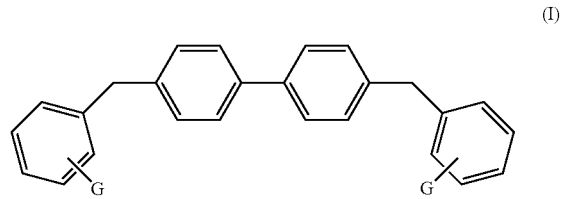

wherein G represents at least one substituent selected from the group consisting of $C_1$-$C_{12}$ alkyl and $C_1$-$C_{12}$ alkoxy.

10 Claims, No Drawings

MARKER COMPOUNDS FOR LIQUID HYDROCARBONS AND OTHER FUELS AND OILS

This application claims the benefit of priority under 35 U.S.C. §119(e) of U.S. Provisional Patent Application No. 61/348,777 filed on May 27, 2010.

This invention relates to compounds useful as chemical markers for liquid hydrocarbons and other fuels and oils.

Marking of petroleum hydrocarbons and other fuels and oils with various kinds of chemical markers is well known in the art. A variety of compounds have been used for this purpose, as well as numerous techniques for detection of the markers, e.g., absorption spectroscopy and mass spectrometry. For example, U.S. Pub. App. No. 2007/0184555 discloses the use of a variety of organic compounds for use in marking liquid hydrocarbons and other fuels and oils. However, there is always a need for additional marker compounds for these products. Combinations of markers can be used as digital marking systems, with the ratios of amounts forming a code for the marked product. Additional compounds useful as fuel and lubricant markers would be desirable to maximize the available codes. The problem addressed by this invention is to find additional markers useful for marking liquid hydrocarbons and other fuels and oils.

STATEMENT OF INVENTION

The present invention provides a compound having formula (I)

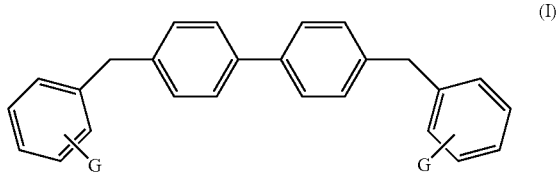

(I)

wherein G represents at least one substituent selected from the group consisting of $C_1$-$C_{12}$ alkyl and $C_1$-$C_{12}$ alkoxy.

The present invention further provides a method for marking a petroleum hydrocarbon, biodiesel fuel or ethanol fuel; said method comprising adding to said petroleum hydrocarbon, biodiesel fuel or ethanol fuel at least one compound having formula (I).

DETAILED DESCRIPTION

Percentages are weight percentages (wt %) and temperatures are in ° C., unless specified otherwise. Concentrations are expressed either in parts per million ("ppm") calculated on a weight/weight basis, or on a weight/volume basis (mg/L); preferably on a weight/volume basis. The term "petroleum hydrocarbon" refers to products having a predominantly hydrocarbon composition, although they may contain minor amounts of oxygen, nitrogen, sulfur or phosphorus; petroleum hydrocarbons include crude oils as well as products derived from petroleum refining processes; they include, for example, crude oil, lubricating oil, hydraulic fluid, brake fluid, gasoline, diesel fuel, kerosene, jet fuel and heating oil. Marker compounds of this invention can be added to a petroleum hydrocarbon, a biodiesel fuel, an ethanol fuel, or a mixture thereof. A biodiesel fuel is a biologically derived fuel containing a mixture of fatty acid alkyl esters, especially methyl esters. Biodiesel fuel typically is produced by transesterification of either virgin or recycled vegetable oils, although animal fats may also be used. An ethanol fuel is any fuel containing ethanol, in pure form, or mixed with petroleum hydrocarbons, e.g., "gasohol." An "alkyl" group is a substituted or unsubstituted hydrocarbyl group having from one to twenty-two carbon atoms in a linear or branched arrangement. Preferably, the compounds of this invention contain elements in their naturally occurring isotopic proportions.

G represents at least one substituent selected from the group consisting of $C_1$-$C_{12}$ alkyl and $C_1$-$C_{12}$ alkoxy, i.e., each aromatic ring bearing a "G" substituent in formula (I) has at least one substituent selected from the group consisting of $C_1$-$C_{12}$ alkyl and $C_1$-$C_{12}$ alkoxy. Preferably, G represents one to three substituents on each aromatic ring, which may be the same or different, preferably two or three substituents, preferably two or three identical substituents. However, the substituents represented by "G" are the same on the two aromatic rings substituted by G,. i.e., the compound is symmetric with a plane of symmetry between the benzene rings of the central biphenyl moiety. Preferably, G represents at least one substituent selected from the group consisting of $C_1$-$C_6$ alkyl and $C_1$-$C_6$ alkoxy, preferably $C_1$-$C_4$ alkyl and $C_1$-$C_4$ alkoxy, preferably $C_1$-$C_4$ alkyl, preferably $C_1$-$C_3$ alkyl, preferably methyl and ethyl.

In the method of this invention, preferably the minimum amount of each marker is at least 0.01 ppm, preferably at least 0.05 ppm, preferably at least 0.1 ppm, preferably at least 0.2 ppm. Preferably, the maximum amount of each marker is 50 ppm, preferably 20 ppm, preferably 15 ppm, preferably 10 ppm, preferably 5 ppm, preferably 2 ppm, preferably 1 ppm, preferably 0.5 ppm. Preferably, a marker compound is not detectible by visual means in the marked petroleum hydrocarbon, biodiesel fuel or ethanol fuel, i.e., it is not possible to determine by unaided visual observation of color or other characteristics that the petroleum hydrocarbon, biodiesel fuel or ethanol fuel contains a marker compound. Preferably, a marker compound is one that does not occur normally in the petroleum hydrocarbon, biodiesel fuel or ethanol fuel to which it is added, either as a constituent of the petroleum hydrocarbon, biodiesel fuel or ethanol fuel itself, or as an additive used in that petroleum hydrocarbon, biodiesel fuel or ethanol fuel.

Preferably, the marker compounds have a log P value of at least 3, where P is the 1-octanol/water partition coefficient. Preferably, the marker compounds have a log P of at least 4, preferably at least 5. Log P values which have not been experimentally determined and reported in the literature can be estimated using the method disclosed in Meylan, W. M & Howard, P. H., *J. Pharm. Sci.*, vol. 84, pp. 83-92 (1995). Preferably the petroleum hydrocarbon, biodiesel fuel or ethanol fuel is a petroleum hydrocarbon or biodiesel fuel; preferably a petroleum hydrocarbon; preferably crude oil, gasoline, diesel fuel, kerosene, jet fuel or heating oil; preferably gasoline.

In one embodiment of the invention, the marker compounds are detected by at least partially separating them from constituents of the petroleum hydrocarbon, biodiesel fuel or ethanol fuel using a chromatographic technique, e.g., gas chromatography, liquid chromatography, thin-layer chromatography, paper chromatography, adsorption chromatography, affinity chromatography, capillary electrophoresis, ion exchange and molecular exclusion chromatography. Chromatography is followed by at least one of: (i) mass spectral analysis, and (ii) FTIR. Identities of the marker compounds preferably are determined by mass spectral analysis. Preferably, mass spectral analysis is used to detect the marker compounds in the petroleum hydrocarbon, biodiesel fuel or ethanol fuel without performing any separation. Alternatively, marker compounds may be concentrated prior to analysis, e.g., by distilling some of the more volatile components of a petroleum hydrocarbon or ethanol.

Preferably, more than one marker compound is present. Use of multiple marker compounds facilitates incorporation into the petroleum hydrocarbon, biodiesel fuel or ethanol fuel of coded information that may be used to identify the origin and other characteristics of the petroleum hydrocarbon, biodiesel fuel or ethanol fuel. The code comprises the identities and relative amounts, e.g., fixed integer ratios, of the marker compounds. One, two, three or more marker compounds may be used to form the code. Marker compounds according to this invention may be combined with markers of other types, e.g., markers detected by absorption spectrometry, including those disclosed in U.S. Pat. No. 6,811,575; U.S. Pat. App. Pub. No. 2004/0250469 and EP App. Pub. No. 1,479,749. Marker compounds are placed in the petroleum hydrocarbon, biodiesel fuel or ethanol fuel directly, or alternatively, placed in an additives package containing other compounds, e.g., antiwear additives for lubricants, detergents for gasoline, etc., and the additives package is added to the petroleum hydrocarbon, biodiesel fuel or ethanol fuel.

The compounds of this invention may be prepared by methods known in the art. For example, substituted benzenes may be alkylated with 4,4'-bischloromethyl-1,1'-biphenyl according to the following equation

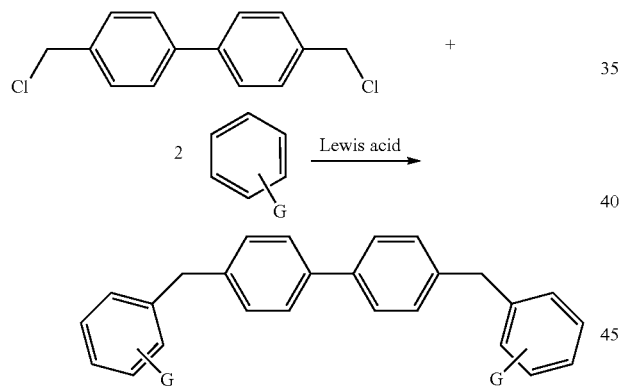

Typical Lewis acids used for alkylation of substituted benzenes are suitable for this process. Preferably, the substituted benzene has substituents only in the 1,4- or 1,3,5-positions, which results in only a single possible positional isomer in the product from the alkylation reaction. For example, if the substituted benzene is 1,4-dimethylbenzene, the product has the following structure in which methyl groups in the product are at the 2 and 5 positions.

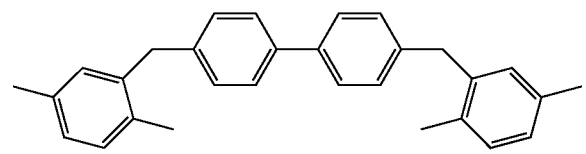

EXAMPLES

Example 1

Preparation of 4,4'-bis(2,5-dimethylbenzyl)-1,1'-biphenyl

A 100mL flask was charged with 4,4'-bis(chloromethyl)-1,1'-biphenyl (1.0 g) and p-xylene (25 mL). To the clear solution stirring at room temperature was added titanium tetrachloride (6 drops) and the mixture instantly became dark brown. After stirring overnight at room temperature, ethanol (2mL) was added to kill the catalyst, and the mixture became a light, cream colored suspension. The mixture was transferred to a separatory funnel and washed with dilute aqueous HCl followed by saturated aqueous sodium bicarbonate. The organic layer was dried over magnesium sulfate, and concentrated to dryness under vacuum on a rotary evaporator. The tan solid was recrystallized from toluene yielding a white crystalline product, mp=144.6 C. GC/MS, HNMR, CNMR and IR were all consistent with the desired product.

Example 2

Preparation of 4,4'-bis(4-methylbenzyl)-1,1'-biphenyl

A 500 mL flask was charged with 4,4'-bis(chloromethyl)-1,1'-biphenyl (25.1 g) and toluene (300 mL). To the clear solution stirring at room temperature was added titanium tetrachloride (1 mL) and the mixture instantly became dark brown. After 5 minutes, a second 1 mL aliquot of catalyst was added. After stirring overnight at room temperature, ethanol (10 mL) was added to kill the catalyst, and the mixture became a light, cream colored suspension. The organic layer was concentrated to dryness under vacuum on a rotary evaporator. The tan solid was suspended in 200 mL boiling toluene and treated with $MgSO_4$. Vacuum filtration through glass fiber filter paper gave a clear solution to which 200 mL heptane was added while hot. The slightly turbid solution was cooled to room temperature, then in a freezer overnight to complete crystallization. White crystals, 17.4 g, mp=161.8 C, were recovered. GC/MS, HNMR, CNMR and IR were all consistent with the desired product.

Example 3

Marking of a Commercial Diesel Fuel 4,4'-bis(2,5-dimethylbenzyl)-1,1'-biphenyl was added to a commercial diesel fuel, purchased from a local Marathon filling station, in a concentration of 0.1 ppm. The marked fuel was analyzed by GC/MS using an Agilent DB-35ms column– 15 meters×0.25 mm ID×0.25 μm. The samples were analyzed using a temperature program starting at 100° C. ramping at 20 C/min to 280 C for a 10 minute hold, followed by a 20 C/min ramp to 340 C with a 6 minute hold then finally a 20 C/min ramp to 360 C with a 1 minute hold time. The 4,4'-bis(2,5-dimethylbenzyl)-1,1'-biphenyl was readily detected with SIM:390. Replicate analyses (n =6) demonstrated a relative standard deviation (RSD) of less than 5%.

Example 4

Stability and Extractability of 4,4'-bis(2,5-dimethylbenzyl)-1,1'-biphenyl

The stability and extractability of the markers was performed using xylene solutions containing between 100-1000 ppm makers and an equivalent amount of squalene internal reference standard using the following protocols:

Laundering:

Mix 95 parts marked xylenes with 5 parts laundering agent in a 100 mL vial. Mix gently for 8 hours using a magnetic stir bar. Stop mixing and remove a xylene solution aliquot. Analyze by GC and compare marker response to reference (unlaundered) sample.

Laundering Agents:
1) 5% sulfuric acid
2) 98% sulfuric acid
3) 5% NaOH solution
4) 50% NaOH solution
5) Activated charcoal (use 98 parts xylenes solution to 2 parts charcoal)
6) 5% bleach To test for metal adsorptivity, 100 mL marked xylene tests solution is treated with 5 grams metal shavings at room temperature for 8 hours. GC analysis is again used to determine any loss of marker to the metal surface.

| Sample | marker area | internal standard area | ratio | marker | % change |
|---|---|---|---|---|---|
| control | 172357 | 189770 | 0.91 | 100.00 | 0.00 |
| 5% NaOH | 180432 | 193264 | 0.93 | 102.79 | -2.79 |
| 50% NaOH | 174722 | 195774 | 0.89 | 98.26 | -1.74 |
| 5% $H_2SO_4$ | 171384 | 192065 | 0.89 | 98.25 | -1.75 |
| 98% $H_2SO_4$ | 180035 | 197296 | 0.91 | 100.47 | 0.47 |
| 2% charcoal | NA | NA | NA | 94 | -6 |
| 5% bleach | NA | NA | NA | 35 | -65 |
| Metals | NA | NA | NA | 104 | +4 |

The invention claimed is:

1. A compound having formula (I)

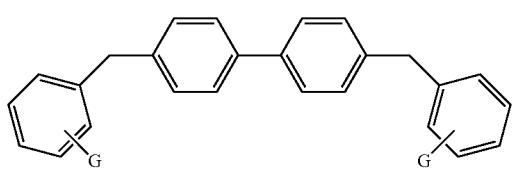

(I)

wherein G consists of at least one substituent selected from the group consisting of $C_1$-$C_{12}$ alkyl and $C_1$-$C_{12}$ alkoxy.

2. The compound of claim 1 in which G consists of at least one substituent selected from the group consisting of $C_1$-$C_6$ alkyl.

3. The compound of claim 2 in which G consists of two or three substituents selected from the group consisting of $C_1$-$C_6$ alkyl.

4. The compound of claim 3 in which G consists of two or three substituents selected from the group consisting of $C_1$-$C_4$ alkyl.

5. The compound of claim 4 in which G consists of two or three methyl groups or two or three ethyl groups.

6. A method for marking a petroleum hydrocarbon, biodiesel fuel or ethanol fuel; said method comprising adding to said petroleum hydrocarbon, biodiesel fuel or ethanol fuel at least one compound having formula (I)

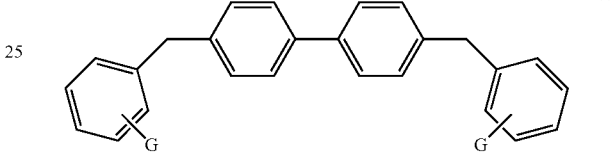

(I)

wherein G consists of at least one substituent selected from the group consisting of $C_1$-$C_{12}$ alkyl and $C_1$-$C_{12}$ alkoxy.

7. The method of claim 6 in which each compound of formula (I) is present at a level from 0.05 ppm to 20 ppm.

8. The method of claim 7 in which G consists of two or three substituents selected from the group consisting of $C_1$-$C_6$ alkyl.

9. The method of claim 8 in which G consists of two or three substituents selected from the group consisting of $C_1$-$C_4$ alkyl.

10. The method of claim 9 in which G consists of two or three methyl groups or two or three ethyl groups.

* * * * *